(12) United States Patent
Mojsilovic et al.

(10) Patent No.: US 6,678,406 B1
(45) Date of Patent: Jan. 13, 2004

(54) METHOD OF COLOR QUANTIZATION IN COLOR IMAGES

(75) Inventors: Aleksandra Mojsilovic, Murray Hill, NJ (US); Emina Soljanin, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/491,551

(22) Filed: Jan. 26, 2000

(51) Int. Cl.$^7$ .................................................. G06K 9/00
(52) U.S. Cl. ......................... 382/162; 358/518; 358/1.9
(58) Field of Search ................................. 382/162, 166, 382/167, 274; 358/518–523, 539; 345/589–593, 597, 600–604

(56) References Cited

U.S. PATENT DOCUMENTS

| | | | | |
|---|---|---|---|---|
| 5,233,413 A | * | 8/1993 | Fuchsberger | 358/518 |
| 5,394,518 A | * | 2/1995 | Friedman et al. | 345/593 |
| 5,450,216 A | * | 9/1995 | Kasson | 358/518 |
| 5,517,334 A | * | 5/1996 | Morag et al. | 358/518 |
| 5,544,284 A | * | 8/1996 | Allebach et al. | 345/603 |
| 5,668,890 A | * | 9/1997 | Winkleman | 382/167 |

FOREIGN PATENT DOCUMENTS

| EP | 0 555 835 A | 8/1993 | H04N/1/60 |
|---|---|---|---|

OTHER PUBLICATIONS

G. Wyszecki et al. *Color Science*, John Wiley, New York (1982).
Pei, Soo–Chang, et al., "Color Image Processing by Using Binary Quaternion–Moment–Preserving Thresholding Technique", *IEEE Transaction On Image Processing*, vol. 8, No. 5, pp. 614–628 (1999).
A. Zaccarin, et al. "A Novel Approach for Coding Color Quantized Images", *IEEE Transactions On Image Processing*, vol. 2, No. 4, pp. 442–453 (1993).
M. T. Orchard, et al., "Color Quantization of Images", *IEEE Transactions On Signal Processing*, vol. 39, No. 12, pp. 2677–2690 (1991).
G. Sharma, et al., "Digital Color Imaging", *IEEE Transactions On Image Processing*, vol. 6, No. 7, pp. 901–932 (1997).

* cited by examiner

*Primary Examiner*—Leo Boudreau
*Assistant Examiner*—Ishrat Sherali

(57) ABSTRACT

A method for assigning a color symbol to an image pixel comprises selecting a luminance value from a discrete set of quantized luminance values; selecting a chrominance value from an ordered discrete set of quantized chrominance values; and composing a color symbol from an index of the selected luminance value and an index of an ordinal position of the selected chrominance value. In particular embodiments of the invention, each discrete chrominance value is selected from a Fibonacci lattice on a constant-luminance plane in a perceptually uniform color space such as Lab or Luv.

26 Claims, 4 Drawing Sheets

METHOD OF COLOR QUANTIZATION IN COLOR IMAGES

FIELD OF THE INVENTION

This invention relates to the processing of two-dimensional color images. More particularly, the invention relates to methods for assigning to each pixel of such an image a symbol representing a selection from a limited set of colors.

ART BACKGROUND

It is well known from studies of color perception that any color can be reproduced in a suitable display device as a combination of three primary colors. Thus, for purposes of image storage, transmission and display, it is convenient to represent the color of each pixel of a digitized image by specifying three coefficients, each representing the contribution from a respective primary color. Because human beings perceive a continuous range of colors, it would, in principle, require an infinite amount of information to specify any one particular color. That is, each of the three coefficients would be of unlimited length.

Such a representational system would of course be impractical. However, it has been found sufficient, for many purposes, to replace the continuous range of colors by a discrete set of colors. The specification of a discrete set of colors is referred to as "color quantization." For example, a so-called full-color display system allocates eight bits to each of the three primary color coefficients. Therefore, each color in such a system is specified by a total of 24 bits, and the total number of specifiable colors is therefore $2^{24}$, or about seventeen million separate colors.

In fact, there are many applications in which an even smaller selection of colors suffices. Thus, for example, a string of fewer than 24 bits, typically of only 8, 12, or 16 bits, represents each displayable color in most currently available display monitors. Here, we refer to each such string as a "symbol."

Typically, some subset of available colors, referred to as the "color codebook," is selected from the full color set. The selection may be the same for all images, in which case the color codebook is said to be "image independent." Alternatively, the selection may be specially adapted for individual images or groups of images. In that case, the color codebook is said to be "image dependent."

Each symbol serves as an index into the color codebook, for retrieving a corresponding color. Thus, a given symbol does not necessarily bear a direct relation to the three primary color coefficients that would be used in a display to reconstruct the corresponding color. Instead, the information necessary for reconstruction would be retrieved from stored information.

In fact, the symbols in many conventional color codebooks are randomly assigned and bear no correlation with the underlying colors. As a consequence, the digital processing of color information in conventional systems cannot take place directly at the symbolic level. Instead, each symbol must be converted to a point in a multidimensional color space for processing.

By contrast, the "color" values of gray-scale images fall along a single axis, i.e., a one-dimensional space. As a consequence, each pixel of such an image is readily assigned a symbol that relates directly to the quantized gray-scale value of that pixel. Simple and computationally fast algorithms are available for performing spatial filtering and other processing of gray-scale images that have been color-quantized in such a manner.

Until now, however, there has lacked any method for quantizing color images that affords similar advantages of simple and computationally fast image-processing algorithms that operate, at least partially, in the symbolic domain.

SUMMARY OF THE INVENTION

We have invented a new method of color quantization. According to our method, a luminance value is selected from a discrete set of quantized luminance values, and a chrominance value is selected from an ordered discrete set of quantized chrominance values. A color symbol is composed from an index of the selected luminance value and an index of an ordinal position of the selected chrominance value, and the color symbol is stored.

In particular embodiments of our invention, the discrete sets of quantized luminance and chrominance values are obtained by quantizing a continuous three-dimensional color space. This is done, in effect, by partitioning the color space into planes of constant luminance, and sampling each resulting plane at a substantially uniform spatial distribution of discrete points.

Significantly, an order is imposed on the sampled points in each plane. Symbols are assigned to the sampled points. Each assigned symbol identifies the luminance level and the ordinality of the corresponding point in color space.

The resulting set of symbols bears a close relationship to the structure of the underlying color space. As a consequence, processing of the color information can be carried out, at least partially, at the symbolic level. This affords advantages of simple and computationally fast processing enjoyed hitherto only in the processing of gray-scale images.

Advantageously, the sampled three-dimensional color space is a space in which the Euclidean distance between two points corresponds to the perceptual difference in color between those points. Within each constant-luminance plane, the sampled points advantageously constitute a spiral lattice. In such a lattice, the radial position of the n'th point is a real power of n, and the angular position of the n'th point is a multiple of n given by $2\pi n \gamma$, where $\gamma$ is a real number, preferably in the vicinity of a Markoff irrational number. In specific embodiments of the invention, the spiral lattice is a Fibonacci lattice, i.e., a spiral lattice in which the radial position is given by the square root of n, and $\gamma$ is approximately equal to $$\pm \frac{\sqrt{5}-1}{2}.$$

DETAILED DESCRIPTION

Figure 1:
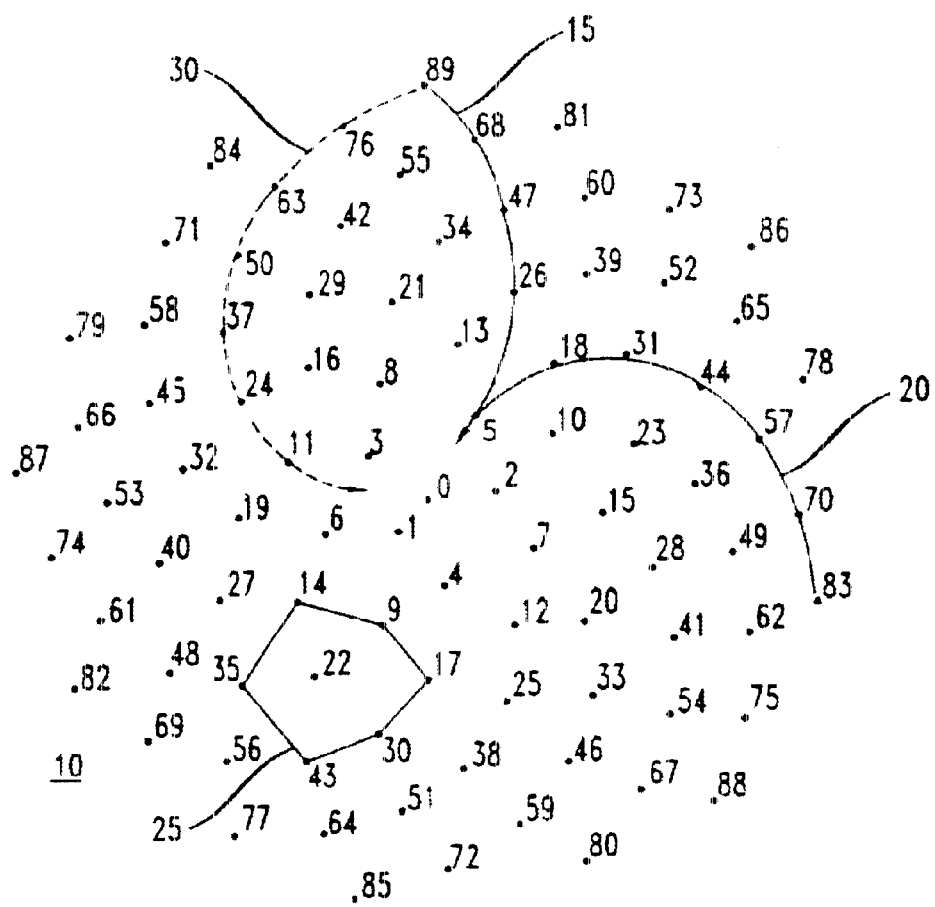
FIG. 1 is an exemplary Fibonacci lattice useful in the practice of the invention in certain embodiments.

It has long been known that perceivable colors can be represented as points in a three-dimensional space. One approach to such representation makes use of three so-called "tristimulus values" as the coordinates of a point representing a given color. The tristimulus values are related in a simple manner to three additive primary colors that, when combined with appropriate weights, produce the given color. Because the set of three primary colors is not unique, any particular system of tristimulus values must be related to the particular selection of primary colors. One example of a color space based on tristimulus values is the RGB color space.

Color spaces based on tristimulus values have certain advantages because, e.g., they can be used to describe the colors of images received from a scanner or images to be displayed on a printer, monitor, or other display device, with relatively simple intermediate processing. However, such color spaces are disadvantageous for representing human perception of colors, because they are not perceptually uniform. That is, human judgment of the difference between two colors does not correlate well with the Euclidean distance between points in such color spaces.

By contrast, color spaces such as Lab and Luv are perceptually uniform, because a given Euclidean distance between a pair of points represents a given perceptual distance, regardless of position within the space. Each of these spaces is characterized by a luminance axis L and a pair of axes (a,b or u,v, respectively) that represent chrominance. Roughly speaking, luminance relates to the brighness of an image element, and chrominance relates to its hue. The Lab and the Luv color spaces are described, e.g., in G. Wyszecki and W. S. Stiles, *Color Science*, John Wiley, New York, 1982. (See especially pages 164–169.)

Through known techniques, it is readily feasible to obtain the coordinates of a point in a perceptually uniform space such as Lab or Luv from the coordinates of a point representing the same color in a space, such as the well-known RGB space, that is based on tristimulus values. As will be appreciated by those skilled in the art, the respective spaces are related through a non-linear transformation that can be expressed in terms of a spatially dependent line element or metric. Such transformations are described, for example, in Wyszecki and Stiles, *Color Science*, cited above.

The exemplary implementation described below uses the Lab color space. Those skilled in the art will appreciate that extensions are readily made to other perceptually uniform color spaces such as the Luv color space.

As a first step in quantizing the color space, the luminance axis is sampled into $N_L$ discrete levels, $N_L$ an integer. Each discrete level has a respective index l and luminance value $L_l$. The luminance index is exemplarily assigned by counting l=1, 2, . . . , $N_L$, with the index 1 assigned to the lowest discrete luminance. Thus, each luminance index defines a respective plane of constant luminance $L_l$.

In each plane of constant luminance, $N_p$ points are selected, $N_p$ an integer. The selection of points is carried out by constructing a spiral of the form:

$r = sn^\delta$ $\theta = 2\pi\eta\gamma + \phi$, wherein r is the radial coordinate, $\theta$ is the angular coordinate, s is a scale factor (which may be 1), $\delta$ and $\gamma$ are real numbers, $\phi$ is an offset angle (which may be 0), and n is a free parameter. A point is selected wherever n assumes an integral value from, e.g., 0 to $N_p-1$. The resulting set of points constitutes a spiral lattice in the constant-luminance plane. The chrominance index of each point is, e.g., the value of n at that point.

Those skilled in the art will appreciate that both the radial coordinate and the angular coordinate can be subsumed into a complex-valued coordinate z, given by $z = sn^\delta e^{j(2\pi n\gamma + \phi)}$, where $j^2 = -1$.

Although an adequate color palette can be obtained with the scale factor s set to 1 and the offset angle $\phi$ set to 0, either or both of these can be set to other values. The scale factor can be adjusted for finer or coarser sampling of the colors in the plane. The offset angle can be adjusted, for example, to assure that points, rather than interstices, of the spiral lattice fall at colors of particular importance.

When the exponent $\delta$ is set to ½, the resulting spiral lattice covers the plane uniformly; that is, averaged over a sufficiently large region, there is a constant number of lattice points per unit area. If constant area coverage is not required, $\delta$ can be set to other values, and can even be made a fuinction of position on the plane.

The factor $\gamma$ is important for controlling the distribution of points in the lattice. If $\gamma$ is a rational number expressed as a ratio of least integers, then as n climbs through values greater than the denominator of such ratio, the points of the spiral lattice will arrange themselves along spokes radiating from the origin. This is undesirable because it does not provide coverage of the plane that is uniform at a relatively fine level. Greater uniformity is achieved when $\gamma$ is an irrational number, and particularly when $\gamma$ belongs to the class of irrational numbers known to mathematicians as Markoff irrational numbers. As explained below, it is especially advantageous to choose for the value of $\pm\gamma$ a particular Markoff number, namely the golden ratio $$\frac{\sqrt{5}-1}{2}.$$

(It should be noted that $\gamma$ may assume positive or negative values. For simplicity, but not limitation, it will be assumed in the following discussion that $\gamma$ takes on positive values.)

Of course infinite precision is not available in a computing machine for representing an irrational number. At best, any computational representation of an irrational number will actually be a rational number in the neighborhood of the irrational number, obtained from it by rounding or truncation. However, provided the denominator in the ratio representation of such a rational number is sufficiently large, the difference in effect upon the spiral lattice will be negligible.

Although the procedure described above will result in a three-dimensional lattice of $N_L \cdot N_p$ points, not every point will necessarily correspond to a perceptible color. That is, only a limited region of, e.g., the RGB space contains valid colors. Thus, after constructing the lattice, we discard each point that does not represent a valid color. This is readily achieved, for example, by discarding each point whose r, g, or b coordinate in RGB space falls outside of the allowed range from 0 to 1. An exemplary color palette that we have used with good results has 139 points remaining after this discarding step.

We refer to the spiral lattice that results when s is constant, δ=½, and $$\gamma = \pm \frac{\sqrt{5}-1}{2},$$

as a Fibonacci lattice. A Fibonacci lattice is shown in FIG. 1. It will be evident from the figure that through each point of the lattice, it is possible to draw a pair of spirals, one clockwise and the other counterclockwise, that sink toward the origin (n=0). The index difference between successive points is 21 for the clockwise spiral and 13 for the counterclockwise spiral. For example, the figure shows clockwise spiral 15 and counterclockwise spiral 20 passing through the point n=5. We refer to these spirals as the "dominant spirals."

Figure 2:
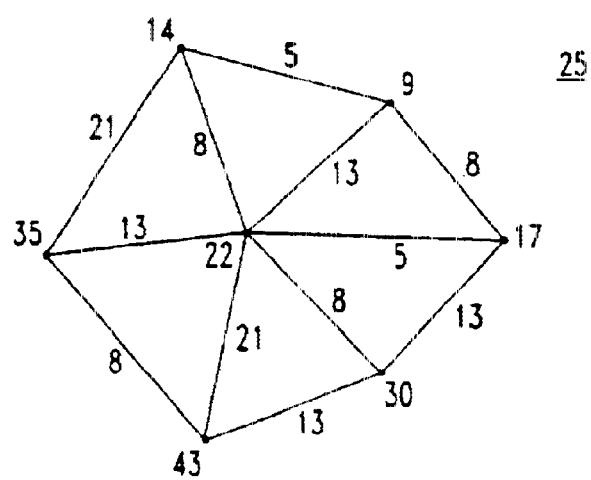
FIG. 2 is a detail of the Fibonacci lattice of FIG. 1.

It will also be evident from the figure that each point of the Fibonacci lattice has six nearest neighbors that form a roughly hexagonal neighborhood around the central point. Such a neighborhood, around the point n=22, is shown as neighborhood 25 in FIG. 1. Greater detail of neighborhood 25 is shown in FIG. 2, to which further reference is made below.

It will also be evident from FIG. 1 that the index difference between each point and each of its nearest neighbors is a Fibonacci number, i.e., a member of the well-known Fibonacci series 1, 1, 2, 3, 5, 8, 13, 21, 34, . . . In FIG. 2, for example, the index difference is shown between the point n=22 and each of its nearest neighbors. FIG. 2 shows that within neighborhood 25, this index difference is 5, 8, 13, or 21.

We now introduce two parameters of the spiral lattice. The minimum distance $d_{min}$ is the Euclidean distance between the highest-index lattice point and its nearest neighbor along the larger dominant spiral, i.e., along the dominant spiral that has the greater Fibonacci number. Thus, for example, the highest-index point of the lattice of FIG. 1 is the point n=89. Of the two dominant spirals 15 and 30 that pass through the point n=89, the larger spiral is spiral 15, since the Fibonacci number of spiral 15 is 21, whereas the Fibonacci number of spiral 30 is only 13. The codebook minimum distance $D_{min}$ is defined by considering the Euclidean distances between all pairs of points of the underlying color space, e.g., the Lab space, sampled by the three-dimensional lattice and corresponding to valid colors. $D_{min}$ is the smallest such distance. Thus, $D_{min}$ is the smaller of: (a) $d_{min}$; and (b) the least distance along the luminance axis between adjacent constant-luminance planes.

Quantization Procedure

Given a pixel p whose color coordinates in the Lab space are $L_p$, $a_p$, $b_p$, it is advantageous to quantize the color of pixel p by finding the lattice point having the least Euclidean distance from the point in the Lab space having those given coordinates. Such quantization is an example of what is known as total square error (TSE) quantization.

An exemplary quantization procedure will now be described with reference to FIG. 3. The Lab coordinates of the input point are obtained (block 100). Then the discrete luminance level nearest $L_p$ is found (block 105). Let the selected level have luminance value L and luminance index l. Then a search is carried out (block 110) for the lattice point in the selected constant-luminance plane that has the smallest TSE, i.e., that lattice point having the least Euclidean distance to the projection of the point ($L_p$, $a_p$, $b_p$) onto the selected plane.

Figure 4:
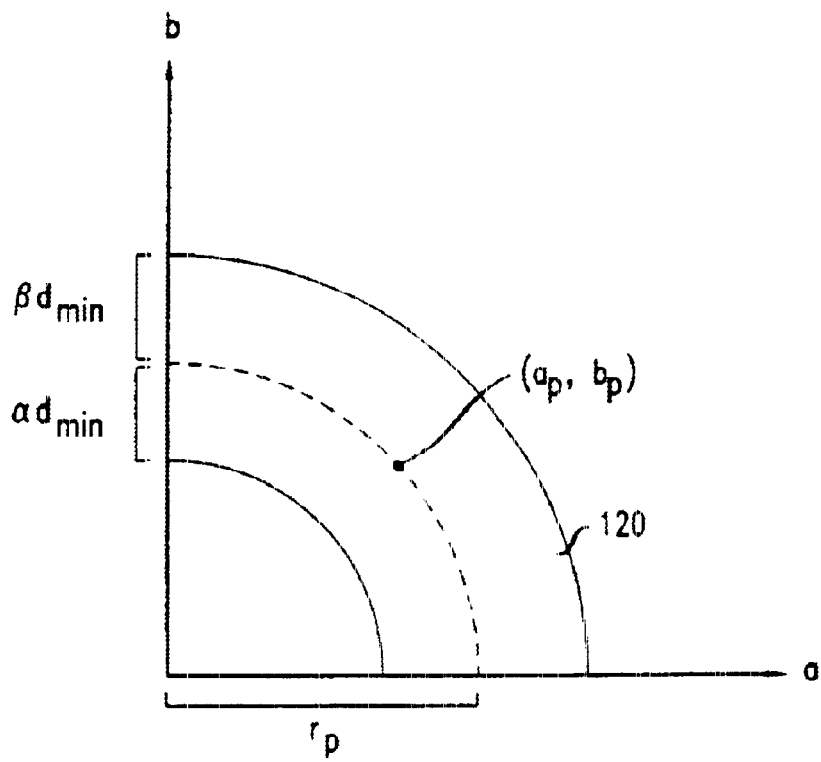
FIG. 4 represents a portion of a constant-luminance plane which is to be searched in accordance with the procedure of FIG. 3.

The properties of the Fibonacci lattice are advantageously used to confine the search to a limited portion of the plane, and thus to shorten the computational time that would otherwise be required to carry out the search. Specifically, as indicated in FIG. 4, it is sufficient to limit the search region 120 to a ring around the origin having a middle radius of approximately $r_p = \sqrt{a_p^2 + b_p^2}$ and a width slightly larger than $d_{min}$. Thus, the ring inner radius may be taken as $r_p - \alpha d_{min}$ and the outer ring radius as $r_p + \beta d_{min}$, where α and β are adjustable parameters, exemplarily both of value 0.5. Because of the order in which the points of the spiral lattice are indexed, and because the radial coordinate is related to the index such that $$n = \left(\frac{r}{s}\right)^2,$$

it is sufficient to search over only those points whose indexes range from the closest integer at or below $(r_p - \alpha d_{min})^2/s^2$ to the closest integer at or above $(r_p + \beta d_{min})^2/s^2$. Moreover, the search is readily limited to an angular sector of the ring. For example, it is advantageous to limit the search to those lattice points whose angular coordinates lie within the same quadrant as the angular coordinate of the point ($a_p$, $b_p$).

Figure 3:
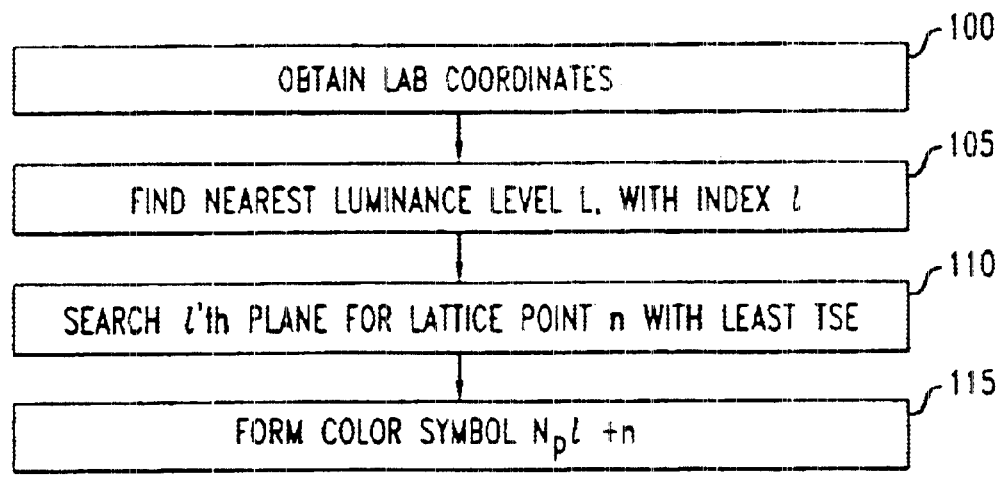
FIG. 3 is a flow diagram illustrating the steps of color quantization according to the invention in certain embodiments.

After the quantized luminance and chrominance indices are determined, they are readily combined into a color symbol, as indicated at block 115 of FIG. 3. One useful form for such a symbol is an ordered pair or multplet comprising the luminance and chrominance indices. However, a form which in many cases will be more useful because it is more compact is a weighted sum of the luminance and chrominance indices. For example, let $N_p$ denote, as above, the number of points in each spiral lattice before discarding invalid colors. Let l and n denote the luminance and chrominance indices, respectively. Then one useful form for the color symbol is $N_p l + n$. From the knowledge of $N_p$, both l and n are readily extracted from a color symbol of this form.

Ordered Dithering

It has long been known that when broad image areas perceived to have constant color are quantized, the reconstructed image, using quantized colors, tends to exhibit false contours that interrupt the constant-color areas. The reason for this is that quantization algorithms will generally ignore a small (and thus imperceptible) color gradient until the accumulated change in color exceeds a threshold. Then, a new color value is assigned. As a result, a perceptible gradient appears in the reconstructed image between the sub-threshold and the supra-threshold regions. It has also been recognized that false contouring can be suppressed by quantizing, in place of the original image, an intermediate image to which random, or pseudorandom, noise has been added. Such a process of adding noise is referred to as ordered dithering.

Ordered dithering is readily integrated into our quantization procedure. To form the intermediate image, a matrix D of noise amplitudes v(i,j) is added to the original image. D is exemplarily a square matrix of some dimension M. The noise amplitude added to pixel i,j of the original image is v(i mod M, j mod M). The distribution of noise amplitudes desirably has zero mean, and its energy spectrum desirably has its minimum at the lowest spatial frequencies. The amplitude of the noise is selected such that areas of constant color are quantized into a variety of neighboring colors, thus reducing the appearance of false contouring.

In the context of our approach to color quantization, noise is readily added simply by substituting quantized colors in randomly selected pixels. That is, in each selected pixel, the original point of the color lattice is replaced by a neighboring point. Typically, the new point will be one of the Fibonacci neighbors, i.e., one of the two nearest neighbors along each of the dominant spirals (thus, four in all); a point on an adjacent constant-luminance plane that lies directly above or below a nearest neighbor along a dominant spiral; or a point on an adjacent constant-luminance plane that lies directly above or below the original point. Thus, the corresponding noise amplitudes v(i,j) are readily determined from the lattice parameter $d_{min}$ or the lattice parameter $D_{min}$, both defined above. Significantly, color substitutions at the same luminance value are readily performed by simply adding to or subtracting from the chrominance index the Fibonacci number corresponding to one of the dominant spirals.

Difference and Average of Two Color Values

Computation of the Euclidean distance between two points of the three-dimensional lattice is simplified because of the relationship between the radial coordinate r and the index n. Thus, the projections of a pair of lattice points of respective chrominance indices m and n onto a common constant-luminance plane are separated by a distance $\Delta_{mn}$ given by $\Delta_{mn}=s[m+n-2\sqrt{mn}\cos[2\pi(m-n)\gamma]]^{1/2}$. A luminance difference $\Lambda_{mn}$ is readily obtained from the respective luminance values $L_m$, $L_n$ according to $\Lambda_{mn}=[L_m-L_n]^{1/2}$. A total difference diff(m,n) is then readily obtained as diff(m,n)= $\sqrt{\Lambda_{mn}^2+\Delta_{mn}^2}$. Various alternative difference formulations are readily definable. In many cases, however, it will be useful to define the total difference as a combination of luminance and chrominance differences, and it will often be useful to define the luminance difference as a function of $L_m-L_n$, or of the absolute value thereof.

A difference formulation Diff(m,n) that is especially useful is obtained by normalizing diff(m,n) to the lattice parameter $D_{min}$, defined above. That is, $$Diff(m, n) = \frac{diff(m, n)}{D_{\min}}.$$

The difference formulation Diff(m,n) may be understood as the least number of steps on the lattice required for a path between the m'th and n'th points.

When gray-scale images are processed, an average of two gray-scale values is readily obtained by, e.g., taking the mean of the two values and rounding to the nearest integer. However, such an averaging procedure is not generally satisfactory when applied directly to color symbols in a three-dimensional, quantized color space. In particular, the rounded mean of a pair of chromaticity indices may be the index of color value relatively distant from both of the colors that were to be averaged.

One solution to this problem is to compute the mean between corresponding points in the underlying Lab space, and then to quantize the result as explained above. The values of the Lab coordinates needed for such a computation may be stored locally in, e.g., a look-up table, or they may be computed from the quantized values of the colors that are to be averaged.

An alternative solution uses the structure of the Fibonacci lattice. According to the alternative solution, we define a new average av(m,n) between colors indexed m and n, respectively. Our new average applies only to chrominance. The corresponding luminances can be averaged by, for example, taking the mean of the luminance values and quantizing to the constant-luminance plane nearest the resulting mean value.

Figure 5:
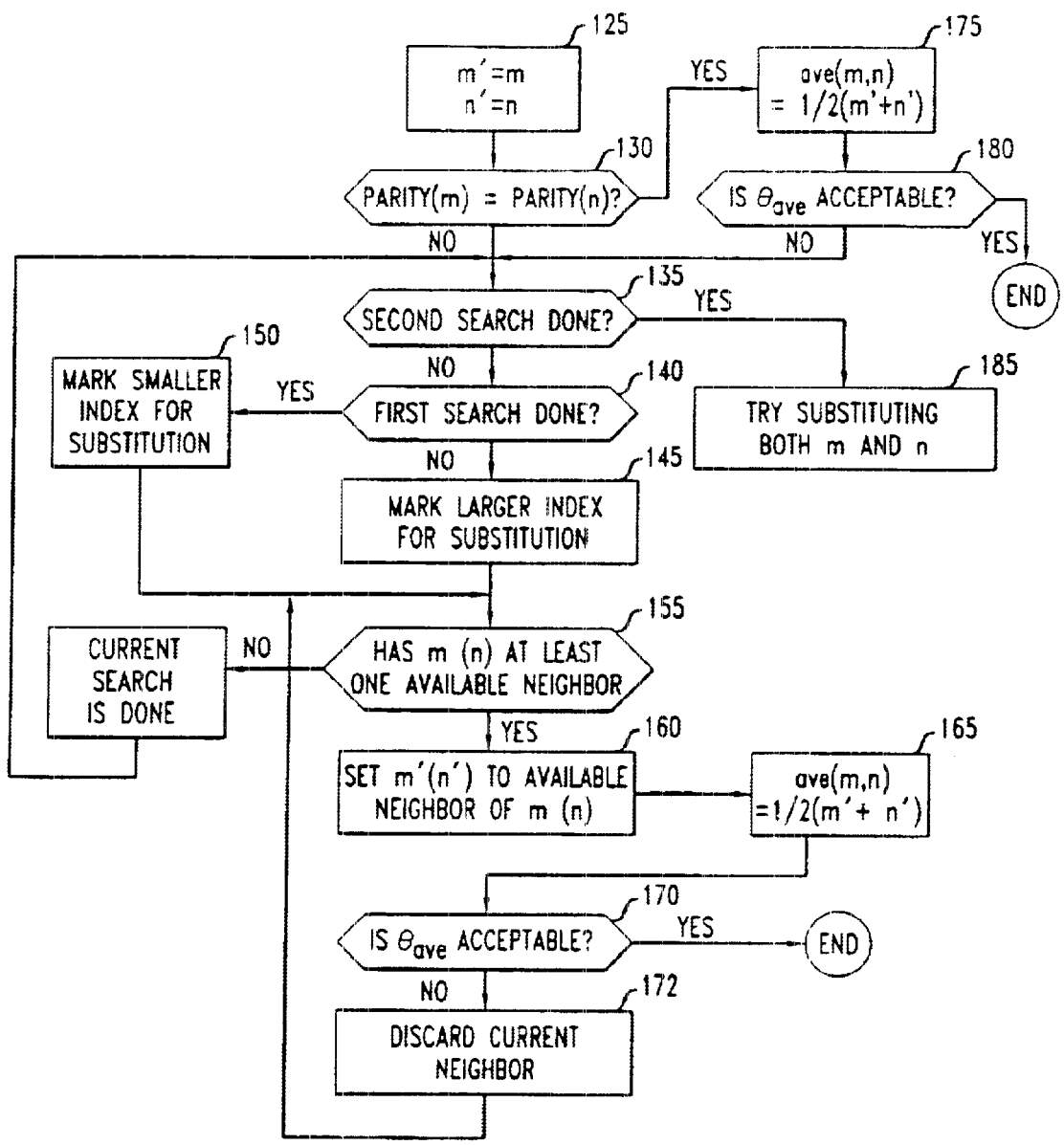
FIG. 5 is a flow diagram of a color-averaging procedure according to the invention in certain embodiments.

The alternative solution for chrominance averaging will now be described with reference to FIG. 5. The average av(m,n) is defined by $$av(m, n) = \frac{1}{2}(m' + n'),$$

where m' and n' are points of the Fibonacci lattice selected as explained below.

As indicated at block 125, the initial settings for m' and n' are m and n, respectively. An initial determination (block 130) is made whether m and n have the same parity. The two indices will have the same parity if both are odd or both are even.

If one of m and n is odd and the other even, one of the two indices must be replaced by a neighbor of opposite parity. In this regard, a neighbor of a given point is a Fibonacci neighbor, i.e., one of the following: one of the two nearest neighbors along each of the dominant spirals (thus four in all); a point on an adjacent constant-luminance plane that lies directly above or below a nearest neighbor along a dominant spiral; or a point on an adjacent constant-luminance plane that lies directly above or below the original point.

To minimize the distance between the original quantized color and its substitute, it is advantageous first to attempt to substitute the original lattice point having the larger index, as indicated by blocks 140 and 145 of the figure. The lattice point to be substituted, unless it lies at the outer edge of the lattice, will have two nearest neighbors on each of the dominant spirals that pass through it. Of these four neighbors, the closest acceptable neighbor should be chosen (block 160). If no neighbor is acceptable (corresponding to the negative outcome of the test in block 155), then the original lattice point having the smaller index is considered in the same way for substitution, as indicated in block 150.

If there is no substitution, then the candidate lattice points for averaging are the original lattice points. If substitution takes place, the candidate points are one original and one substituted point or, as explained below, two substituted points.

The mean index is then taken by summing the indices of the candidate lattice points and dividing by two. Blocks 165 illustrates this step for substituted points, and block 175 illustrates this step for unsubstituted (i.e., original) points. Because the candidate lattice points at this step necessarily have the same parity, their sum is even and their mean is an integer, and thus the mean is an index of a point of the lattice. However, the resulting mean index may or may not lie within an acceptable angular range. That is, the angular coordinates of the original lattice points define a closed angular range (i.e., the smaller angular range between the two lattice points, not exceeding 180°), and the mean index is acceptable only if it has an angular coordinate lying on that range. If the angular coordinate of the mean index lies outside of that range, the mean index is rejected, as indicated by the negative outcomes of the tests in blocks 170 and 180.

Several options are available if the mean index is rejected. One option is to discard the current substitution as indicated at block 172, return to the original lattice points, and to try a new substitution. If no single-point substitution results in an acceptable mean index, as indicated by the positive outcome of the test in block 135, then double substitution is attempted, as indicated at block 185.

A second option is here referred to as the "rewind" procedure. According to the rewind procedure, a search of the constant-luminance plane is carried out within a ring-shaped region containing the radius at which lies the lattice point having the mean index. The search is limited to the smaller angular range (i.e., the range that does not exceed 180°) defined by the two original lattice points. The inner and outer radii of the ring-shaped region are determined, for example, as for the quantization procedure described above. The object of the search is to find the lattice point, within the acceptable angular range, whose radial coordinate is nearest the radial coordinate of the mean-index lattice point.

Gradient Operators and Edge Detection

In the processing of gray-scale images, edges are readily detected by evaluating a gradient between pixel values in a given neighborhood. However, it is much more difficult to devise an acceptable edge detector for color images. The difficulty arises because three dimensions, and not simply the single gray-scale dimension, are required to describe color, and because human perception tends to place edges differently for different color components of the same image. However, by using the difference operator diff(m,n) defined above, we have found a simple way to extend conventional gray-scale gradient operators for the processing of color images. Significantly, our extended gradient operators operate directly on the color symbols, i.e., on the luminance and chrominance indices, and thus they are relatively economical in the use of computational resources.

One example of a conventional horizontal gradient operator $H_x$ and vertical gradient operator $H_y$ takes the form of the pair of 3×3 windows below:

$$H_x = \begin{bmatrix} -a & 0 & a \\ -b & 0 & b \\ -c & 0 & c \end{bmatrix}, \quad H_y = \begin{bmatrix} -a & -b & -c \\ 0 & 0 & 0 \\ a & b & c \end{bmatrix}.$$

Each of these operators is scanned across the image. At each position in the scan, nine pixels of the image are overlain by corresponding elements of the operator. At each position in the scan, the gradient at the pixel underlying the element in the second row and second column of the operator is evaluated as a weighted sum. The gray-scale value of each pixel overlain by an element is weighted by that element and added to the sum. The weights a, b, and c may take on various values, depending on the class of operator that is used. For example, (a, b, c) for the Prewitt operator is (1, 1, 1); for the Sobel operator it is (1, 2, 1), and for the isotropic operator it is (1, √2, 1). Thus, at a pixel location (i,j), wherein i denotes the row of the image where the pixel lies and j denotes the corresponding column, the horizontal gradient $g_x(i,j)$ is given by $g_x(i,j)=a[I(i-1,j+1)-I(i-1,j-1)]+b[I(i,j+1)-I(i,j-1)]+c[I(i+1,j+1)-I(i+1,j-1)]$ and the vertical gradient $g_y(i,j)$ is given by $g_y(i,j)=a[I(i-1,j-1)-I(i+1,j-1)]+b[I(i-1,j)-I(i+1,j)]+c[I(i-1,j+1)-I(i+1,j+1)]$ where I(i,j) denotes the gray-scale value at pixel (i,j).

For the color image, having color symbol P(i,j) at pixel (i,j), we define analogous color gradient operators $\tilde{g}_x(i,j)$ and $\tilde{g}_y(i,j)$ by:

$\tilde{g}_x(i,j)=a\cdot\text{Diff}[P(i-1,j+1),P(i-1,j-1)]+b\cdot\text{Diff}[P(i,j+1),P(i,j-1)]+c\cdot\text{Diff}[P(i+1,j+1),P(i+1,j-1)];$ $\tilde{g}_y(i,j)=a\cdot\text{Diff}[P(i-1,j-1),P(i+1,j-1)]+b\cdot\text{Diff}[P(i-1,j),P(i+1,j)]+c\cdot\text{Diff}[P(i-1,j+1),P(i+1,j+1)].$ The corresponding vector gradient has a magnitude $\tilde{g}(i,j)=\sqrt{\tilde{g}_x^2(i,j)+\tilde{g}_y^2(i,j)}$ and a direction $$\tilde{\theta}(i,j) = \tan^{-1}\frac{\tilde{g}_y(i,j)}{\tilde{g}_x(i,j)}.$$

Compression and Coding of Color-Quantized Images

Figure 6:
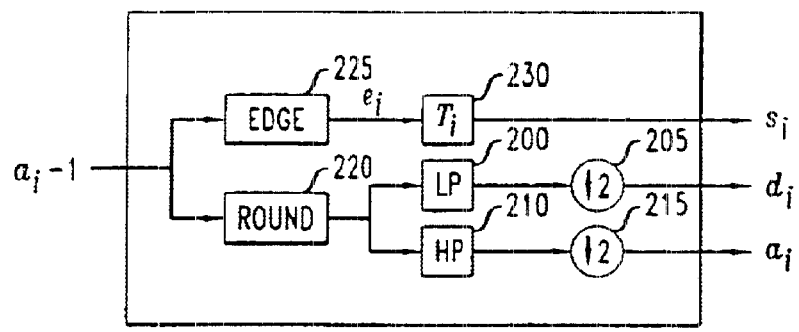
FIG. 6 is a schematic diagram of one stage of an image coder that incorporates principles of the present invention.
Figure 7:
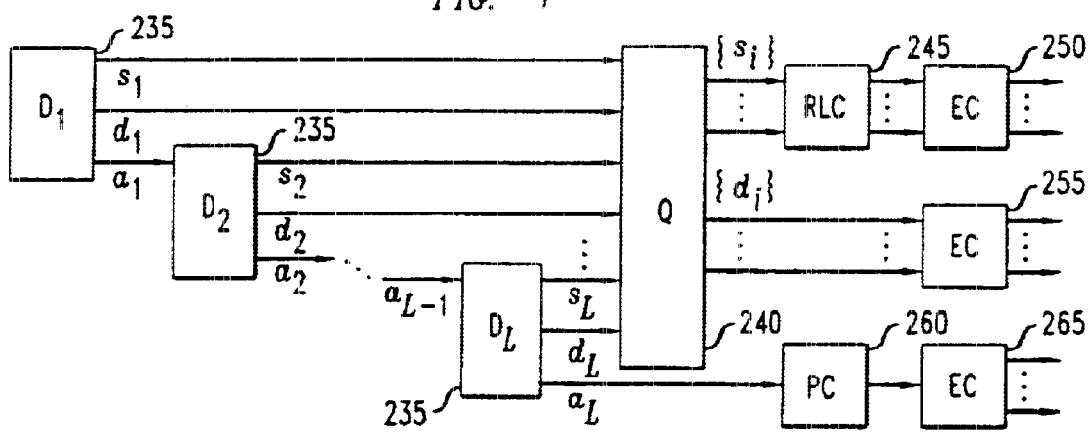
FIG. 7 is a schematic diagram of a color coder that includes multiple stages of the kind illustrated in FIG. 6.

FIGS. 6 and 7 show an illustrative image coder that incorporates principles described above. The purpose of the coder is to perform multiresolution decomposition of a color-mapped image. The output of the coder is a low-resolution approximation of the original color map, and a set of images representing details at different levels of resolution, and along different directions.

The illustrative image coder has multiple decomposition levels $D_1, D_2, \ldots, D_L$. The input to the i'th level $D_i$ consists of an image $a_{i-1}(m,n)$, where m and n represent pixel row and column coordinates, respectively. The input $a_0(m,n)$ to the first decomposition level represents the raw image. One decomposition level of the coder is shown in FIG. 6.

With reference to FIG. 6, each row or column of the input image is filtered at block 200 with a one-dimensional low-pass filter, and then subsampled at block 205 by a factor of two. Similarly, each row or column is filtered at block 210 with a one-dimensional high-pass filter, and then subsampled at block 215 by a factor of two. The low-pass output of the i'th level is denominated $d_i(m,n)$, and the high-pass output is denominated $a_i(m,n)$. Exemplary filtering operations, which are described below, are performed on the color symbols, i.e., on the luminance and chrominance indices. Because the filtering operations involve taking one-half the sum or difference of index pairs, it is desirable to carry out substitutions, as described above, to assure that each pair contains chrominance indices of the same parity. In the present context of image coding, we refer to such substitutions as "rounding" operations. In FIG. 6, the rounding operations are indicated at block 220.

At each decomposition level, we also compute an edge map $e_i(m,n)$, as indicated in block 225 of FIG. 6. Any suitable edge-detection operator can be used to compute the edge map. One example is the gradient operator described above. An exemplary implementation uses the magnitude of the vector gradient to detect edges. Those skilled in the art will appreciate that in alternate implementations, one-dimensional gradients may be used. As indicated at block 230 of FIG. 6, the raw output $e_i(m,n)$ of edge detector 225 is subjected to binary quantization. Exemplarily, for a given pixel (m,n), the output $s_i(m,n)$ takes the value 1 if $e_i(m,n)$ exceeds a quantization threshold $T_i$ for the pertinent decomposition level, and $s_i(m,n)$ takes the value 0 if $e_i(m,n)$ does not exceed the quantization threshold. We refer to the quantized output $s_i(m,n)$ as the "significance map." As will be explained below, the significance maps are used at a subsequent stage of the image coder for quantizing a set of detail signals.

As noted above, low-pass filtering is performed at block 200, and high-pass filtering is performed at block 210. Each filter is exemplarily a one-dimensional perfect reconstruction filter. Exemplary such filters are the Haar filters having weights (½,½) for the low-pass filter and (½,-½) for the high-pass filter. Thus, for example, if $p'_1$ represents the rounded color symbol at the (m,n) pixel position and $p'_2$ represents the rounded color symbol at the (m,n+1) pixel position, then the outputs $a_i(m,n)$ and $d_i(m,n)$, which respectively represent the average and difference along the horizontal direction, are given by:

$$a_i(m, n) = \frac{p'_1 + p'_2}{2}; \quad d_i(m, n) = \frac{p'_1 - p'_2}{2}.$$

Each of the outputs $a_i$, $d_i$, and $s_i$ represents an image. The resolution of each of these images along the direction of decomposition is two times lower than the resolution of the input image $a_{i-1}$. The output image $a_i$ is taken as the input to the (i+1)'th decomposition, which is carried out in the direction orthogonal to that of the i'th decomposition. Thus, a total of L decompositions are carried out in alternating directions, as indicated by blocks 235 of FIG. 7, which are labeled $D_1, D_2, \ldots, D_L$.

The overall result consists of: the image approximation $a_L(m,n)$, which has L/2 lower resolution than the original color map; the set $\{d_i\}$ of L detail signals; and the set $\{s_i\}$ of L significance maps, i=1, ..., L. The detail signals and significance maps are taken as input to the quantizer Q, indicated at block 240 of FIG. 7.

At quantizer 240, each detail signal $d_i$ is set to 0 if its corresponding significance coefficient $s_i$ is 0. If the corresponding signficance coefficient is 1, then $d_i$ is passed through unchanged, subject to the rule described below. We have found that signal compression can be improved by taking advantage of spatial redundancy between detail coefficients. Specifically, we assume that if a detail signal $d_i(m,n)$ is insignificant at the i'th scale relative to the threshold $T_i$, i.e., if the corresponding significance coefficient is 0, then the detail coefficients at the two finer scales, i.e., at the (i−1)'th and (i−2)'th scales, are also likely to be insignificant at the (m,n) pixel location. Accordingly, quantization is carried out on the coarsest scales first. When a detail signal at a given level is quantized to zero, the corresponding detail signals at the two next finer levels are also automatically set to zero, and the corresponding significance coefficients are set to zero.

The significance maps for all levels, as output from quantizer 240, are first run-length coded as shown at block 245, and then entropy coded, as shown at block 250, using conventional coding techniques. The detail signals for all levels, as output from quantizer 240, are entropy coded using conventional coding techniques, as indicated at block 255. The image approximation $a_L(m,n)$ is first predictive coded, as indicated at block 260, and then entropy coded, as indicated at block 265, using conventional coding techniques.

Because the reconstructed image will contain only colors from the original quantized color palette, there is no need to perform additional quantization at the decoder. As a consequence, the coding scheme described here makes it possible to employ a decoder of relatively low complexity while maintaining relatively high image quality and bit rates.

Exemplary Implementation

The input colors for a typical color monitor are expressed in terms of primary-color values r, g, and b in the RGB representation. Each input value, is related to the corresponding displayed intensity via a non-linear relationship. For example, the input red value r is related to the displayed red intensity $I_r$ by $r=(I_r)^\gamma$, where $\gamma$ is typically about 2.3. (This parameter is unrelated to the lattice parameter $\gamma$ discussed above.) Typical image-capturing devices compensate for the nonlinearity between each input primary and its luminance by providing pre-distorted output. That is, the output of such a device is subjected to the inverse transformation, such as: $r=(I_r)^{1/\gamma}$. Such predistorted primary colors are often referred to as "gamma-corrected colors."

Figure 8:
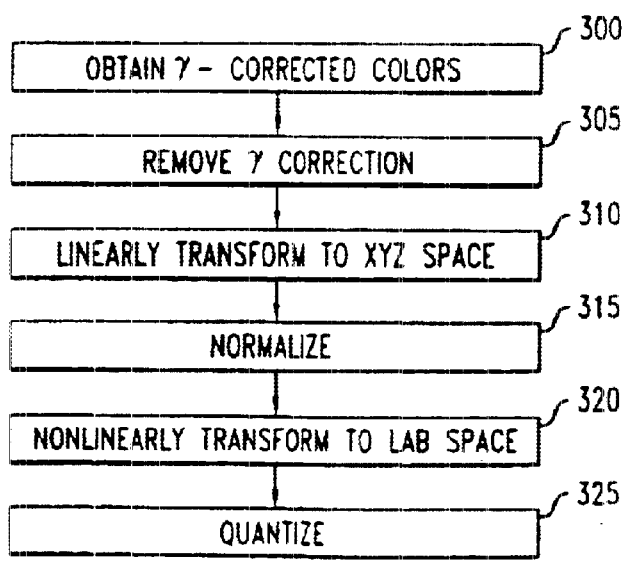
FIG. 8 is a flow diagram of an exemplary procedure for applying color-quantization principles of the present invention to color data obtained from an image-capturing device.

With reference to FIG. 8, an exemplary implementation of our color-quantization procedures begins at block 300 with the step of obtaining a set of gamma-corrected RGB colors for each of one or more pixels of an image. At block 305, the gamma correction is removed. At block 310, the color data are transformed into the well-known XYZ color space using a linear operator. In the XYZ space, known techniques are used to normalize the data with respect to the illumination white point (block 315). At block 320, the color data are converted to the Lab representation via a nonlinear transformation. Such a procedure is described, for example, in Wyszecki and Stiles, *Color Science*, cited above. At block 325, the raw colors are mapped to an appropriate palette of quantized colors as described above in connection with FIGS. 3 and 4.

One exemplary palette of 1024 quantized colors is readily generated from the following parameters:

$$\gamma = \frac{\sqrt{5} - 1}{2};$$

$\delta=0.5$; $\phi=0.1$ rad; $N_L=28$; $N_p=124$
$\{L_i\}=\{0,4,10,15,20,25,31,35,40,44,49,52,56,60,64,68, 72,76,80,85,88,92,95,97,98,99,100\}$.

A smaller exemplary palette, having only 91 colors, is readily generated from the following parameters:

$$\gamma = \frac{\sqrt{5} - 1}{2};$$

$\delta=0.5$; $\phi=0.05$ rad; $N_L=7$; $N_p=56$
$\{L_i\}=\{0,10,40,65,85,94,100\}$.

What is claimed is:

1. A method for assigning a color symbol to at least one pixel of an image, comprising the steps of:
   selecting a luminance value from a discrete set of quantized luminance values, the quantized luminance values being generated by partitioning a three-dimensional color space into planes of constant luminance;
   selecting a chrominance value from an ordered discrete set of quantized chrominance values;
   composing a color symbol from an index of the selected luminance value and an index of an ordinal position of the selected chrominance value, wherein the color symbol exhibits a relationship to a structure of the three-dimensional color space which permits processing of color information to be carried out, at least partially, at a symbolic level; and
   storing the color symbol.

2. The method of claim 1, wherein the composing step comprises adding the chrominance index to a multiple of the luminance index.

3. The method of claim 1, wherein the joint selection of a quantized luminance value and a quantized chrominance value defines a discrete point, to be referred to as a lattice point, in said space.

4. The method of claim 3, wherein, in each constant-luminance plane, the quantized chrominance values occupy a spiral lattice.

5. The method of claim 4, wherein, in each spiral lattice:
   each quantized chrominance value has an ordinal index n which is a non-negative integer, a radial coordinate r, and an angular coordinate θ;
   n and r are related by the equation $r=sn^\delta$, wherein s is a scale factor, and δ is a real number; and n and θ are related by the equation θ=2πn γ+φ, wherein γ is a real number, and φ is an offset angle.

6. The method of claim 5, wherein δ is constant over each constant-luminance plane.

7. The method of claim 5, wherein δ varies with position on each constant-luminance plane.

8. The method of claim 5, wherein δ equals ½.

9. The method of claim 5, wherein γ is approximately equal to $$\frac{\sqrt{5}-1}{2} \text{ or } -\frac{\sqrt{5}-1}{2}.$$

10. The method of claim 4, wherein:
the pixel has a color value associated with a point in a color space; and
the steps of selecting a quantized luminance value and a quantized chrominance value comprise searching for a lattice point that is closest to the pixel color value according to at least one distance measure.

11. The method of claim 10, wherein the step of searching for a closest lattice point comprises searching a portion of a constant-luminance plane for that lattice point having the least Euclidean distance from the pixel color value.

12. The method of claim 11, wherein said search in a constant-luminance plane is limited to at most an annular region of said plane.

13. A method for reproducing at least one pixel of a color image comprising the steps of:
receiving a color symbol for the pixel, wherein the color symbol exhibits a relationship to a structure of an underlying three-dimensional color space and defines a luminance level and an ordinality of a corresponding point in a plane of constant luminance of the three-dimensional color space;
converting the color symbol to a color value specified in a form usable by a display device, wherein color information is processed, at least partially, at a symbolic level; and
displaying the pixel such that it has the specified color value, wherein:
the converting step comprises recovering from the color symbol a scalar index designating a luminance value and a scalar index designating a chrominance value.

14. The method of claim 13, wherein the converting step further comprises deriving from the chrominance index a radial coordinate and an angular coordinate in a three-dimensional color space.

15. The method of claim 14, wherein:
the luminance index defines a plane in the color space;
the chrominance index designates an ordinal position on a spiral lattice lying in said plane; and
the radial and angular coordinates are derived by relating the chrominance index to a mathematical description of the spiral.

16. The method of claim 15, wherein:
the chrominance index n is related to the radial coordinate r through an equation of the form r=sn^δ, wherein s is a scale factor, and δ is a real number; and
the chrominance index n is related to the angular coordinate θ through an equation of the form θ=2πn γ+φ, wherein γ is a real number, and φ is an offset angle.

17. An image-processing method comprising the steps of:
obtaining representations of color values for plural pixels of an image, computing pairwise color differences between at least some pairs of pixels, and storing the color differences, wherein:
the color value of each pixel is represented as a color symbol composed from a scalar luminance index indicative of a luminance value and a scalar chrominance index indicative of a chrominance value, wherein the color symbol exhibits a relationship to a structure of an underlying three dimensional color space which permits processing of color information to be carried out, at least partially, at a symbolic level;
each pairwise color difference is computed, in part, by combining a difference between scalar luminance values with a difference between scalar chrominance indices; and
the luminance value being selected from a discrete set of quantized luminance values, the quantized luminance values being generated by partitioning a three-dimensional color space into planes of constant luminance.

18. The method of claim 17, wherein the color symbol of each pixel comprises the sum of the chrominance index with a multiple of the luminance index.

19. The method of claim 17, wherein the difference between a pair m, n of chrominance indices is a function of the quantity $\Delta_{mn}=S[m+n-2\sqrt{mn}\cos(2\pi(m-n)\gamma)]^{1/2}$, wherein γ is a real number, and s is a scale factor.

20. The method of claim 19, wherein the difference between a pair $L_m$, $L_n$, of luminance values is a function of the quantity $\Lambda_{mn}=L_m-L_n$ or of the absolute value thereof.

21. The method of claim 20, wherein the color difference between two color values having respective chrominance indices m and n and respective luminance values $L_m$ and $L_n$ is computed as $(\Lambda_{mn}^2+\Delta_{mn}^2)^{1/2}$.

22. The method of claim 17, wherein the method comprises at least one operation of digitally filtering an image, and the pairwise color-difference computations are included in the digital filtering operation.

23. The method of claim 17, wherein the method comprises at least one operation of edge detection, and the pairwise color-difference computations are included in the edge-detection operation.

24. A method for assigning a color symbol to at least one pixel of an image, comprising the steps of:
selecting a luminance value from a discrete set of quantized luminance values, wherein the selection of a quantized luminance value defines a constant-luminance plane in a three-dimensional color space;
selecting a chrominance value from an ordered discrete set of quantized chrominance values, wherein the joint selection of a quantized luminance value and a quantized chrominance value defines a lattice point in the three-dimensional color space;
composing a color symbol from an index of the selected luminance value and an index of an ordinal position of the selected chrominance value; and
storing the color symbol;
wherein:
the quantized chrominance values occupy a spiral lattice in each constant-luminance plane, and in each spiral lattice:
each quantized chrominance value has an ordinal index n which is a non-negative integer, a radial coordinate r, and an angular coordinate θ;
n and r are related by the equation r=sn^δ, wherein s is a scale factor, and δ is a real number; and n and $\theta$ are related by the equation $\theta=2\pi n\, \gamma+\phi$, wherein $\gamma$ is a real number, and $\phi$ is an offset angle.

25. A method for reproducing at least one pixel of a color image comprising the steps of:

receiving a color symbol for the pixel;

converting the color symbol to a color value specified in a form usable by a display device; and displaying the pixel such that it has the specified color value, wherein:

the converting step comprises recovering from the color symbol a scalar index designating a luminance value and a scalar index designating a chrominance value, and deriving from the chrominance index a radial coordinate and an angular coordinate in a three-dimensional color space;

the luminance index defines a plane in the color space;

the chrominance index designates an ordinal position on a spiral lattice lying in the plane;

the radial and angular coordinates are derived by relating the chrominance index to a mathematical description of the spiral;

the chrominance index n is related to the radial coordinate r through an equation of the form $r=sn^\delta$, wherein s is a scale factor, and $\delta$ is a real number; and the chrominance index n is related to the angular coordinate $\theta$ through an equation of the form $\theta=2\pi n\, \gamma+\phi$, wherein $\gamma$ is a real number, and $\phi$ is an offset angle.

26. An image-processing method comprising the steps of: obtaining representations of color values for plural pixels of an image, computing pairwise color differences between at least some pairs of pixels, and storing the color differences, wherein:

the color value of each pixel is represented as a color symbol composed from a scalar luminance index indicative of a luminance value and a scalar chrominance index indicative of a chrominance value; and each pairwise color difference is computed, in part, by combining a difference between scalar luminance values with a difference between scalar chrominance indices;

wherein the difference between a pair m, n of chrominance indices is a function of the quantity $\Delta_{mn}=s[m+n-2\sqrt{mn}\cos(2\pi(m-n)\gamma]^{1/2}$, wherein $\gamma$ is a real number, and s is a scale factor.

* * * * *